US012033498B2

(12) United States Patent
Littlejohn

(10) Patent No.: US 12,033,498 B2
(45) Date of Patent: Jul. 9, 2024

(54) SELECTING TRAFFIC PROBES FOR VALIDATING TRAFFIC FLOW PREDICTIONS

(71) Applicant: iHeartMedia Management Services, Inc., San Antonio, TX (US)

(72) Inventor: Jeffrey Lee Littlejohn, Cincinnati, OH (US)

(73) Assignee: iHeart Media Management Services, Inc., San Antonio, TX (US)

( * ) Notice: Subject to any disclaimer, the term of this patent is extended or adjusted under 35 U.S.C. 154(b) by 0 days.

(21) Appl. No.: 18/235,623

(22) Filed: Aug. 18, 2023

(65) Prior Publication Data

US 2023/0401953 A1 Dec. 14, 2023

Related U.S. Application Data

(63) Continuation of application No. 18/105,764, filed on Feb. 3, 2023, now Pat. No. 11,823,569, which is a continuation of application No. 17/542,369, filed on Dec. 4, 2021, now Pat. No. 11,574,539, which is a continuation of application No. 16/704,181, filed on Dec. 5, 2019, now Pat. No. 11,195,411, which is a
(Continued)

(51) Int. Cl.
*G08G 1/04* (2006.01)
*G08G 1/01* (2006.01)

(52) U.S. Cl.
CPC ......... *G08G 1/0129* (2013.01); *G08G 1/0112* (2013.01); *G08G 1/0116* (2013.01); *G08G 1/0141* (2013.01); *G08G 1/04* (2013.01)

(58) Field of Classification Search
CPC .. G08G 1/0129; G08G 1/0112; G08G 1/0116; G08G 1/0141; G08G 1/04
See application file for complete search history.

(56) References Cited

U.S. PATENT DOCUMENTS 7,912,628 B2 3/2011 Chapman
9,672,734 B1 6/2017 Ratnasingam
(Continued)

OTHER PUBLICATIONS

Bogenberger, K.; Quality Management Methods for Real-Time Traffic Information; Procedia—Social and Behavioral Sciences vol. 54; Oct. 2012; pp. 936-945.
(Continued)

*Primary Examiner* — Mathew Franklin Gordon
(74) *Attorney, Agent, or Firm* — Harness, Dickey & Pierce, P.L.C.

(57) ABSTRACT

One or more traffic-data sets including traffic probes, which include one or more identifiable items of information obtained from one or more traffic probe devices, are obtained. A traffic flow prediction to be validated is selected. The selected traffic flow prediction is associated with a road segment and a time period. A list of traffic probes to be used in validating the traffic flow prediction is generated. The list of traffic probes includes information obtained from traffic probe devices that travelled an entire length of the road segment during the time period. Travel times of the traffic probe devices that travelled an entire length of the road segment during the time period are ordered, and outliers are removed from the list of traffic probes. A validated traffic-flow prediction is generated based on traffic probes remaining in the list of traffic probes, and the validated traffic-flow prediction is transmitted to an end-user processing device.

20 Claims, 6 Drawing Sheets

Related U.S. Application Data continuation of application No. 15/469,820, filed on Mar. 27, 2017, now Pat. No. 10,515,542.

(56) References Cited

U.S. PATENT DOCUMENTS

| | | | |
|---|---|---|---|
| 2016/0086285 | A1 | 3/2016 | Peters |
| 2016/0321919 | A1 | 11/2016 | Xu |
| 2017/0323563 | A1 | 11/2017 | Pundurs |
| 2018/0374345 | A1 | 12/2018 | Suzuki |

OTHER PUBLICATIONS

Dance, et al.; Enhancing Navigation Systems with Quality Controlled Traffic Data; SAE Technical Paper, Paper No. 2008-01-0200; Apr. 2008; 7 pages.

Kulmala, et al.; Quality package for safety related and real-time traffic information services; EIP+ 3.1 Testing and Validating of the Quality Recommendations and Results for Traffic Information from EIP; Version 1.0; Feb. 2016; pp. 1-85.

TMC Compendium—Alert-C Coding Handbook; Feb. 1999; 98 pages.

Tomtom; Tomtom Real Time Traffic Information; White Paper; 2015; www.geospatial.tomtom.com; 21 pages.

SELECTING TRAFFIC PROBES FOR VALIDATING TRAFFIC FLOW PREDICTIONS

CROSS REFERENCE TO RELATED PATENTS

The present U.S. Utility patent application claims priority pursuant to 35 U.S.C. § 120 as a continuation of U.S. Utility application Ser. No. 18/105,764 entitled "VALIDATING TRAFFIC FLOW PREDICTIONS BASED ON DATA FROM A SELECTED SUBSET OF TRAFFIC PROBE DEVICES," filed Feb. 3, 2023, which is a continuation of U.S. Utility application Ser. No. 17/542,369 entitled "QUALITY CORRECTED TRAFFIC FLOW PREDICTIONS," filed Dec. 4, 2021, now U.S. Pat. No. 11,574,539 on Feb. 7, 2023, which is a continuation of U.S. Utility application Ser. No. 16/704,181 entitled "TRAFFIC PROBE DEVICE SELECTION," filed Dec. 5, 2019, now U.S. Pat. No. 11,195,411 on Dec. 7, 2021, which is a continuation of U.S. Utility application Ser. No. 15/469,820 entitled "AUTOMATED TRAFFIC DATA VALIDATION," filed Mar. 27, 2017, now U.S. Pat. No. 10,515,542 on Dec. 24, 2019, which are hereby incorporated herein by reference in their entirety and made part of the present U.S. Utility patent application for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND

1. Technical Field

This invention relates generally to automated validation of traffic data, and more particularly to after-the-fact validation of traffic data and/or predictions based on traffic-related information obtained from specially selected traffic probe devices.

2. Description of Related Art

Various traffic reporting systems disseminate traffic messages, such as estimated travel times, delays, traffic flow, detours, and the like, to end users via various distribution channels. For example, the traffic messages can be provided to end users through a dedicated navigation device, which maps travel routes using global positioning satellite (GPS) technology, through software applications on mobile communications devices such as "smart phones," or via television, satellite, or radio broadcasts.

Traffic information used as the basis for traffic messages distributed to end users can be obtained from various navigation device users who have agreed to share travel information, by collecting data from the user's navigation devices, phones, or other mobile communication devices. Other sources of traffic information can include various sensors, such as speed cameras, radar speed sensors, or the like, positioned to gather traffic information. Traffic information can also be obtained from users reporting direct observations of road closures, traffic accidents, or the like. Each of the devices or sources providing the information may be referred to as a "probe," or "traffic probe," although the term "probe" is sometimes also used to refer to one or more pieces of data obtained from a device. Traffic information from the various probes can be aggregated and processed by various providers to generate estimated travel times and other traffic data to be included in traffic messages disseminated to users.

The accuracy of the disseminated traffic data/information can be periodically verified, but conventional verification techniques are usually manual, and often require collecting validation or verification information from drivers specially tasked to travel specified roadways. The information collected from these drivers serves as a baseline, sometimes referred to as a "ground truth," which is compared against the disseminated traffic data in the traffic messages to verify the accuracy of the disseminated traffic data. This manual verification procedure can be both time consuming and costly, due for example, to vehicle, fuel, and personnel expenses. Additionally, because manual traffic validation techniques require having a person physically travel particular roadways at particular times, in many cases it is impractical to perform traffic data verifications on a particular roadway more frequently than approximately yearly. Infrequent, for example yearly or monthly verification of disseminated traffic data, is less than ideal for a technology that provides commuters and other drivers with near-real-time information relied on by the recipients to be timely and accurate.

BRIEF SUMMARY

The present invention is directed to apparatus and methods of operation that are further described in the following Brief Description of the Drawings, the Detailed Description of the Invention, and the claims. Various features and advantages of the present invention will become apparent from the following detailed description of the invention made with reference to the accompanying drawings.

BRIEF DESCRIPTION OF THE SEVERAL VIEWS OF THE DRAWING(S)

Figure 5:
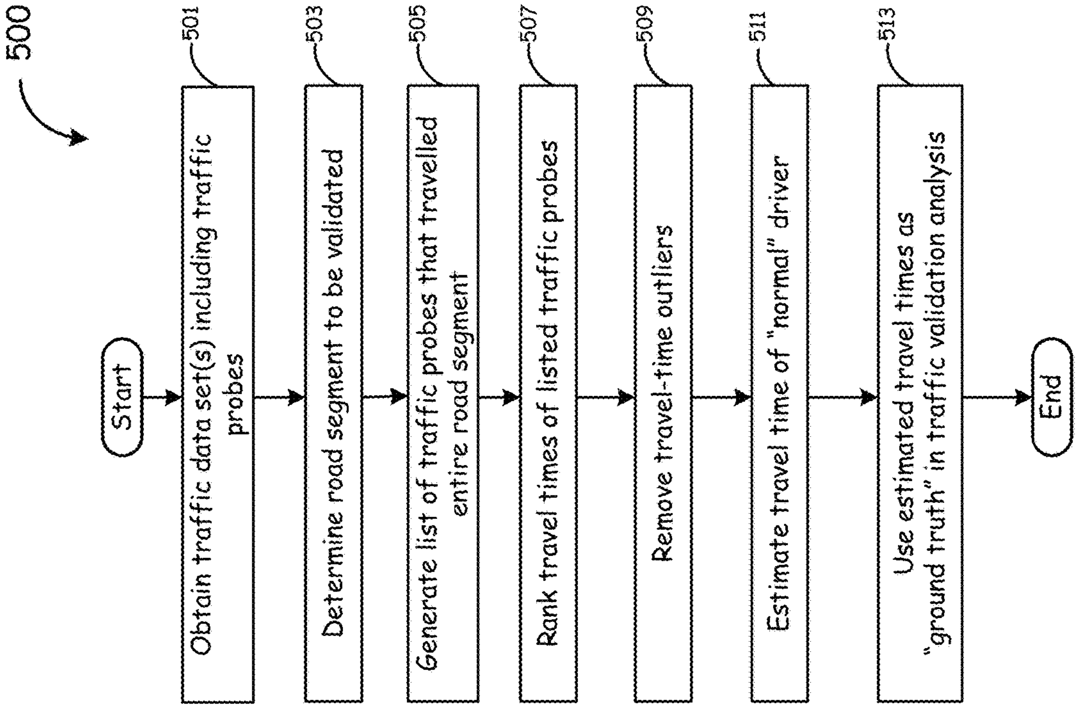
Figure 6:
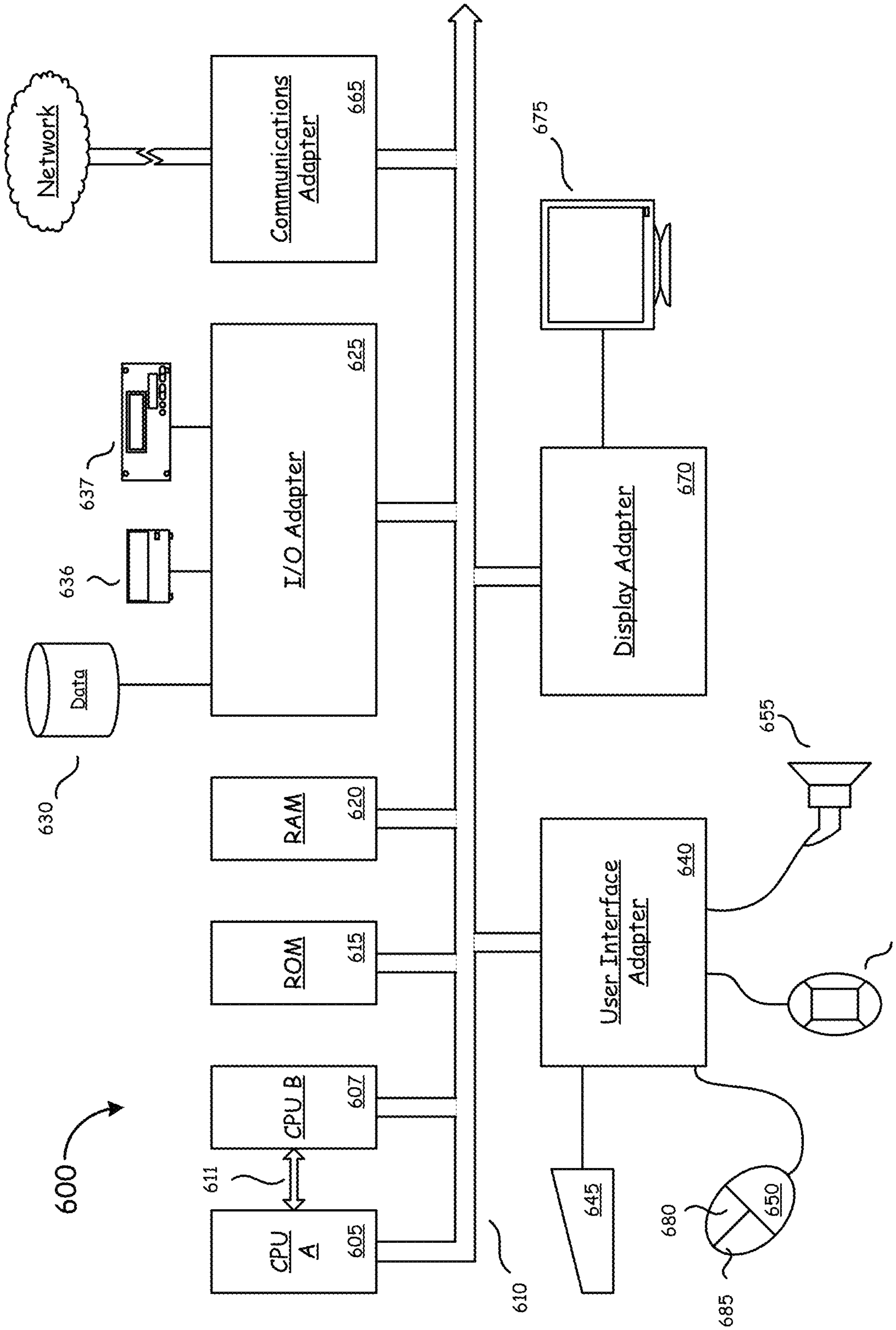

FIG. 5 is a flow diagram illustrating a method of determining a ground truth for use in a traffic validation analysis, in accordance with various embodiments of the present disclosure; and FIG. 6 is a high-level block diagram of a processing system, part or all of which can be used to implement various servers, machines, systems, and devices in accordance with various embodiments of the present disclosure.

DETAILED DESCRIPTION OF THE INVENTION

In various embodiments discussed herein, traffic-flow predictions can be generated and disseminated to distribution providers such as internet, radio, television, cable, and satellite broadcasters. Generation of traffic-flow predictions can be performed by a prediction module that receives traffic-related information from various traffic probe devices, such as roadway sensors, cameras, users of navigation devices capable of transmitting speed and location information to a traffic data collection system, or the like. This raw, traffic related information obtained from the traffic probe devices can be processed by the prediction module to generate a traffic-flow prediction associated with a particular time. Usually, but not necessarily, the traffic-flow prediction is a current, or near real-time traffic-flow estimate.

The output of the prediction module, e.g., a traffic-flow prediction, can be automatically verified by a verification module without requiring manual collection of "ground truth" data for verification. For example, a verification module can obtain traffic related information, some or all of which may have been used by the prediction module to make the initial traffic-flow prediction disseminated to end users. In some implementations, dissemination of the initial traffic-flow prediction to one or more end-users or distribution systems can be delayed until after the verification process has been completed.

Regardless of whether the initial traffic-flow prediction is disseminated before or after verification, the verification module can implement the same process. For example, the verification module can select particular traffic probe devices, and gather information from the selected traffic probe devices for use in performing traffic data verification/validation. As used herein, a "traffic data verification" includes verification of the accuracy of fully processed traffic data, such as traffic-flow predictions, included in traffic messages.

In at least some embodiments, any probe devices that do not reflect travel along an entire roadway segment of interest can be removed from consideration during the traffic data validation process. Then, using information from selected probe devices, and specifically excluding probe devices that did not travel the entire roadway segment of interest, the verification module can generate an estimated "actual" traffic flow associated with the roadway at a particular time. The estimated actual traffic-flow is, in at least one embodiment, distinct and separate from the predicted traffic flow.

In some embodiments, the estimated actual traffic-flow can be generated by the verification module using the same algorithm employed by the prediction module, except based on inputs from a limited set of data probe devices. In other embodiments, however, both a different algorithm and different sets of data probe devices can be used by the prediction module and the verification module.

The estimated actual traffic-flow generated by the verification module can be used as the "ground truth" in a quality analysis that determines a relationship between the traffic-flow prediction and the estimated actual traffic-flow. In various embodiments, the quality analysis is a time-space oriented reference testing method, such as QKZ (QualitaetsKontrollZentrum), or QFCD (Floating Car Data Quality), methodologies.

In at least some embodiments, the quality analysis produces two measures of quality: $QKZ_1$ (a detection rate) and $QKZ_2$ (a false alarm rate). In various implementations, $QKZ_1$ can be considered to be a percentage of a roadway of interest that is properly identified by the initial the traffic-flow prediction as experiencing congestion, while $QKZ_2$ can be considered to be a percentage of the same roadway of interest that is incorrectly identified by the traffic-flow prediction as being congested. For example, if $QKZ_1=90$ and $QKZ_2=10$, then the combined quality measure can be said to be 90/10.

By using the various techniques and systems described herein, quality measures can be determined for traffic data much more frequently, for example daily or hourly, than would otherwise be possible using conventional manual techniques that allow for only infrequent verification. In some implementations, data verification can even be performed prior to disseminating the traffic data for delivery to end-users. Rapid verification/validation could also allow prompt correction of any previously disseminated data not satisfying a quality threshold, and generation of an ongoing traffic quality score.

As used herein, the terms "traffic data," and "traffic-related information", refer at various times to 1) raw traffic data obtained from sensors, traffic probe devices, and the like; 2) partially processed traffic data that has been filtered, organized, and/or otherwise manipulated using various algorithms to generate data that is not yet ready to be delivered for dissemination to traffic data distribution systems; and 3) fully processed traffic data which is ready to be disseminated or delivered to traffic data distribution systems and/or end users. In some cases, the context in which the term "traffic data" is used will indicate which type of traffic data is being referred to, while in other cases the type of traffic data may be explicitly indicated.

In various embodiments, traffic data considered to be "fully processed" and ready for dissemination may be further processed by a broadcaster or other traffic data provider to change formats of a traffic message, add additional information to a traffic message, or the like. Any additional processing performed by a system that delivers the traffic data does not necessarily mean that the traffic data transmitted to the delivery system is not "fully processed." For example, in various embodiments the term "fully processed" traffic data can include, but is not limited to, data such as delay estimates, travel time estimates, road closures inferred from other traffic data, estimated clearing times, and/or messages including such information.

In some embodiments, the term "traffic-flow prediction" includes any of various predictions generated from traffic data, including but not limited to, those just listed as being included in "fully processed" traffic data. Similarly, unless otherwise required by context, the term "traffic flow" is generally used herein in a broad sense to include not only traffic-flow identifiers such as "slow," "stop-and-go," and "free flow," but also includes information about situations or events that affect the movement of traffic.

Figure 1:
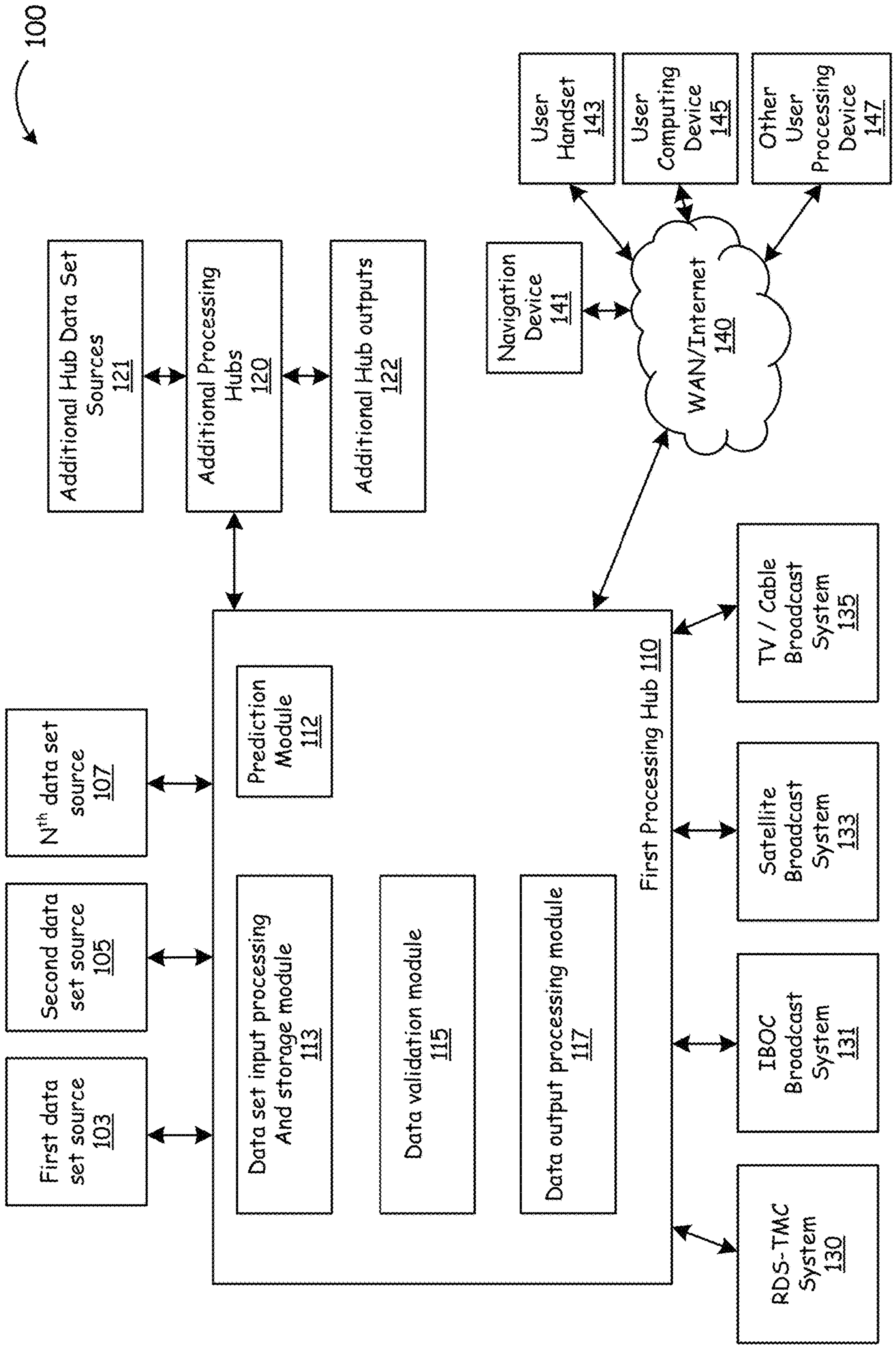
FIG. 1 is a schematic block diagram of a traffic-flow messaging system, in accordance with various embodiments of the present disclosure.

Referring now to FIG. 1, is a schematic block diagram of a traffic-flow messaging system 100 will be discussed in accordance with various embodiments of the present disclosure. Traffic-flow messaging system 100 can include first processing hub 110, which includes input processing and storage module 113, data validation module 115, data output processing module 117, and prediction module 112. First processing hub 110 can receive raw, partially processed, or fully processed traffic data from any of various different sources, including first dataset source 103, second dataset source 105, and $N^{th}$ dataset source 107.

First processing hub 110 can produce fully or partially processed traffic data for delivery or dissemination to end user devices via various broadcast systems and devices. For example, first processing hub 110 can transmit traffic predictions to RDS-TMC (radio data system—traffic message channel) system 130, IBOC (in-band on channel) broadcast system 131, satellite broadcast system 133, television/cable broadcast system 135, or to end-user devices such as navigation device 141, user handset 143, user computing device 145, or other user processing device 147, via a wide area network such as Internet 140.

In some embodiments, traffic-flow messaging system 100 can include additional processing hubs 120, each having additional hub dataset sources 121 and additional hub outputs 122. Additional hub dataset sources 121 need not be distinct or separate from the dataset sources used by first processing hub 110.

Some or all of the dataset sources, for example, first dataset source 103, can include various traffic probe devices that provide raw or partially processed traffic related information, for example sensors and cameras located along various roadways, intersections, on-ramps, off-ramps, or the like. Some or all of the dataset sources, for example, second dataset source 105, can be governmental agencies, third party data providers, navigation companies, satellite providers, wireless carriers, radio broadcasters, Internet service providers, or other entities that have the ability to collect, aggregate, and/or provide traffic data generated by any of various traffic probe devices. Additionally, some or all of the dataset sources can include traffic probe devices associated with particular drivers. For example, $N^{th}$ dataset source 107 can include navigation devices, smart phones, tablets, computers, or various other communication-capable devices carried by or included in vehicles moving along various roadways.

First processing hub 110 can obtain traffic related information from any of the various dataset sources, and provide the traffic related information to prediction module 112, which in at least one embodiment is implemented by a processor programmed to take raw or partially processed traffic data as input and produce as output a traffic-flow prediction for a roadway segment. Note that in at least one embodiment, the term "prediction" can include the case where an estimate of traffic flow at a first time is "predicted" to remain the same up through the point in time where the prediction is disseminated to end users. Thus, if traffic data is determined at 7:40 am and disseminated at 7:45 am, the traffic data determined at 7:40 am can be considered to be a prediction of traffic flow at 7:45 am.

In some embodiments, however, a predictive analysis, for example a least squares or other regression analysis, a lookup table generated based on past traffic patterns for a particular area, or the like, can be applied to the initial estimate, so that the predicted traffic flow at 7:45 am may be different from the traffic flow determined at 7:40 am. In some embodiments, the predictive analysis can be varied depending on a time difference between making the initial traffic flow analysis and the anticipated dissemination of traffic data.

Data validation module 115 can be used to validate the traffic-flow prediction generated by prediction module 112, or to validate a traffic-flow prediction received from one of the dataset sources. In at least some embodiments, data validation module 115 obtains traffic data from first dataset source 103, second dataset source 105, or $N^{th}$ dataset source 107, and processes the received traffic data to determine a "ground truth" traffic-flow estimate for a particular roadway at a particular time. The ground truth traffic flow estimate can be compared to the traffic-flow prediction generated by prediction module 112, to determine various quality measures. In at least one embodiment, the quality measures determined by data validation module 115 include $QK_1$ and $QK_2$.

The quality measures can be stored for historical evaluation, and in some implementations included in any of various reports generated by first processing hub 110. In some embodiments, if one or more quality measures fails to satisfy a threshold requirement, the algorithm used by the by prediction module 112 can be automatically or manually altered to produce output traffic-flow predictions that more closely correspond to the ground truth determined by data validation module 115.

In some implementations, data validation module 115 can be used to validate a traffic-flow prediction obtained from one of the dataset sources, rather than verifying the output of prediction module 112. For example, if $N^{th}$ dataset source 107 includes fully processed traffic data, for example a traffic prediction related to a particular roadway on a particular date, the data validation module 115 can generate quality metrics for some or all elements of the $N^{th}$ dataset source.

Data output processing module 117 can be used to provide fully processed traffic data, for example traffic-flow predictions, to various distribution channels and systems. In some embodiments, traffic data provided to different distribution systems can be different from the traffic data provided to other distribution systems. For example, traffic data provided to RDS-TMC system 130 can include predictions based on an estimated dissemination time-lag of 5 minutes, while traffic data provided to television/cable broadcast system 135 can include predictions based on an estimated dissemination time-lag of 15 minutes. In other embodiments, however, traffic data is provided without taking into account estimated time-lag.

In some embodiments, one or more of first dataset source 103, second dataset source 105, and $N^{th}$ dataset source 107 can include fully processed data, including traffic-flow predictions generated by third parties, and it is not necessary to use prediction module 112 to generate the traffic-flow prediction. In some such embodiments, the verification techniques described herein can be applied to the third party traffic-flow predictions, allowing the quality of datasets obtained from outside sources to be compared against other outside sources, and/or against traffic-flow predictions generated by prediction module 112. In some such embodiments, traffic-flow predictions generated by prediction module 112, and meeting a particular quality threshold, can be treated as the "actual estimated traffic-flow" for validation of third party traffic data. In other embodiments, however, the third party traffic-flow predictions are treated in the same manner as predictions generated by prediction module 112, and the resulting third-party quality measures can be compared to quality measures associated with predictions generated by prediction module 112.

Figure 2:
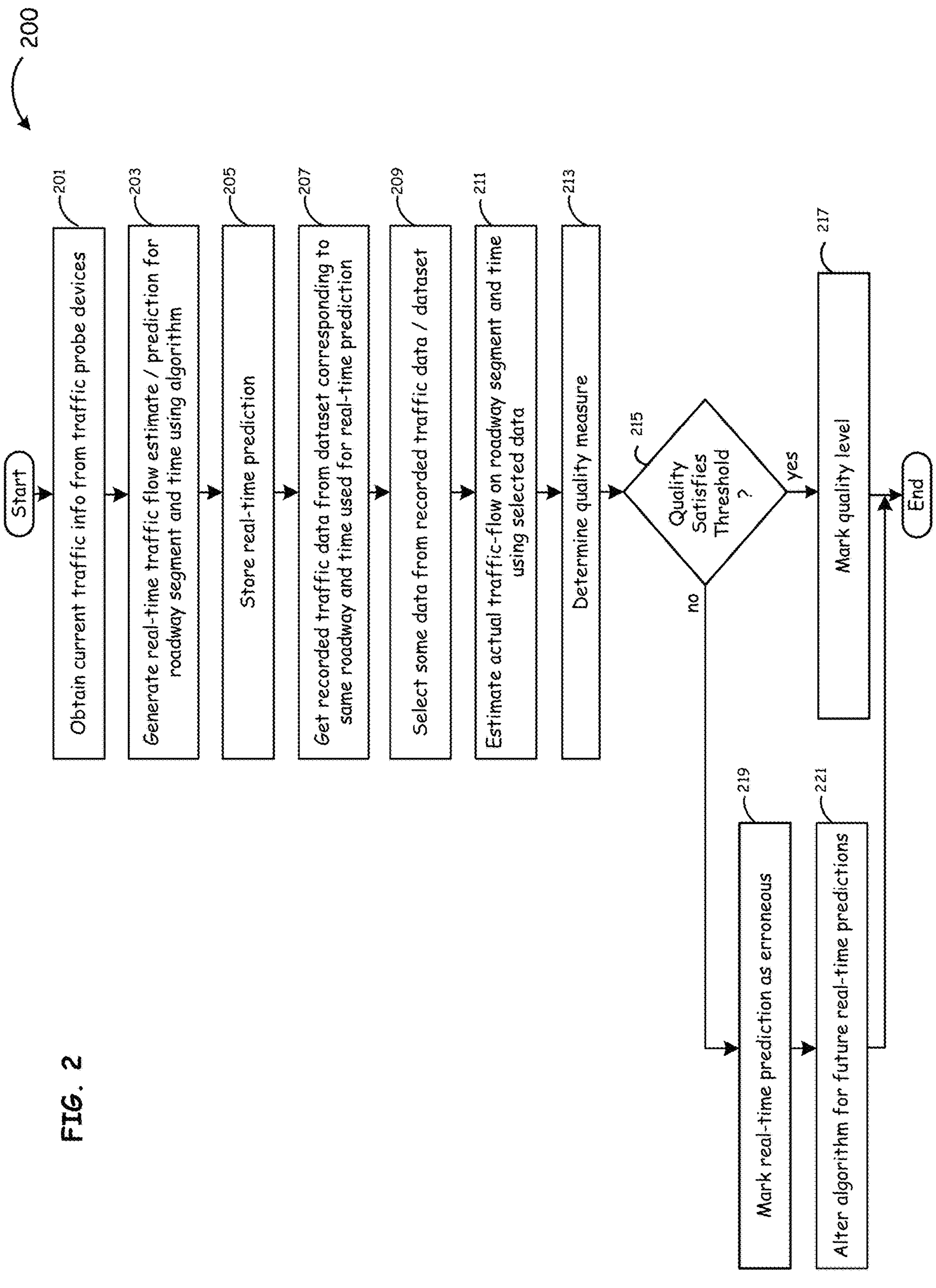
FIG. 2 is a flow diagram illustrating a method that includes altering a traffic-prediction algorithm based on one or more quality thresholds, in accordance with various embodiments of the present disclosure.

Referring next to FIG. 2 a flow diagram illustrating a method 200 that alters a traffic-prediction algorithm based on one or more quality thresholds will be discussed in accordance with various embodiments of the present disclosure. Method 200 begins at block 201, where substantially current traffic information is obtained from various traffic probe devices. The information obtained from the traffic probe devices can include data or other information indicating speed, direction, device type, device identification, time of collection, distance, or the like. As illustrated by block 203, the traffic data obtained from the traffic probe devices can be used to generate traffic flow estimates, or predictions, associate with particular roadway segments and times. These traffic-flow predictions can be considered to be "real-time" predictions in some embodiments.

As illustrated at block 205, the traffic-flow predictions can be stored for later use in verification and dissemination. Additionally, although not specifically illustrated in FIG. 2, the traffic-flow predictions can also be disseminated at this point.

As illustrated at block 207, recorded traffic data can be obtained from a dataset corresponding to the same roadway and time associated with the traffic-flow prediction. The recorded traffic data can be a subset of the dataset used for making the real-time traffic-flow prediction, but in some embodiments the recorded traffic data includes additional datasets, from either or both of the same set of probe devices or a different set of probe devices.

As illustrated at block 209, some of the data from the recorded traffic dataset can be selected. In at least one embodiment, data from the traffic dataset is selected to more closely match traffic conditions on a particular road segment at a particular time, as compared to the set of traffic data used to make the real-time traffic-flow prediction. In various embodiments, selecting the particular data from the set of data can include selecting only particular traffic probe devices, selecting particular types of traffic probe devices, selecting particular data from selected traffic probe devices, or some combination thereof. Additionally, in some embodiments, only traffic probe devices determined to have travelled an entire roadway segment of interest are selected. Any traffic probe devices that pull off the roadway, detour, or otherwise fail to continuously travel the entire roadway segment of interest can be excluded from use in determining the ground truth.

In some implementations, a single device can be used as a proxy for a driver or other traveler, so that if the single device does not travel the entire roadway segment under consideration, the driver is not considered to have travelled the entire roadway segment. However, in some embodiments, especially those using fixed-location traffic probe devices such as cameras, roadway sensors, or the like, a determination that a particular driver travelled the entire roadway segment of interest can be made without using a particular device as a proxy. For example, two cameras, one at the beginning of a roadway segment and one at the end of the roadway segment, can be used to determine that a particular driver or other traveler has travelled the entire roadway segment of interest. Those two cameras, however, may not provide sufficient information to determine that the driver did not stop to fill her vehicle up with gas at some point along the roadway. The information from those two traffic cameras can be, in some cases, combined with information from other traffic probe devices to make determinations regarding temporary stops.

As illustrated at block 211, an estimated actual traffic-flow can be generated using the specially selected traffic data from the recorded traffic datasets. The estimated actual traffic-flow can be determined by using the same algorithm used for the real-time traffic-flow prediction, but with the specially selected input data. In other embodiments, different algorithms are used to generate the estimated actual traffic-flow and the first, real-time, traffic-flow prediction.

As illustrated by block 213, the estimated actual traffic-flow can be used as a ground truth in determining the quality of the traffic-flow prediction. For example, a first quality index ($QKZ_1$), representing the detection rate, can describe the degree to which the traffic-flow predictions concur with the estimated actual traffic-flows. In some cases, the traffic-flow prediction and the estimated actual traffic-flow represent congestion events. In some such embodiments, $QKZ_1$ can be calculated using the following formula:

$$QKZ_1 = D/E$$

where D=A∩E (the intersection of A and E), where:

- A represents a predicted area of congestion (e.g., the traffic-flow prediction) and an area of congestion reported by data obtained from traffic probe devices, and
- E represents an actual area of congestion, also referred to as a "ground truth (e.g., the estimated actual traffic-flow)

A second quality index ($QKZ_2$), representing a false alarm rate, can be used to describe, for example, a proportion of the traffic-flow prediction that is not actually congested. In at least some embodiments, $QKZ_2$ can be calculated using the following formula:

$$QKZ_2 = 1 - \left(\frac{D}{A}\right)$$

where D=A∩E (the intersection of A and E), where:

- A represents a predicted area of congestion (e.g., the traffic-flow prediction) and an area of congestion reported by data obtained from traffic probe devices, and E represents an actual area of congestion, also referred to as a "ground truth (e.g., the estimated actual traffic-flow)

In various embodiments, the use of both the first and second quality indices, e.g., $QKZ_1$ and $QKZ_2$, can be used as a single expression of data/prediction quality. Using traffic congestion as an example, if the detection rate ($QKZ_1$) is 90 and the false alarm rate ($QKZ_2$) is 10, it can be inferred that traffic-flow predictions will identify 90% of traffic-flow congestion issues, and will mistakenly identify normal traffic-flow as being congested only 10% of the time. The quality measure in this example can be expressed as 90/10. Other quality measures can be similarly calculated, and other quality measure calculations employing a "ground truth" can be used without departing from the spirit and scope of the present disclosure.

As illustrated by block 215, a check can be made to determine if the quality measure satisfies a quality threshold. For example, in some embodiments a quality measure of less than 85/15 may be considered to be insufficient to satisfy a quality threshold, and may trigger corrective actions, while a quality measure of greater than 90/10 may be sufficient to satisfy a quality threshold. Quality thresholds can be set based on various requirements, for example processing resources available and/or required to generate traffic-flow predictions of a desired quality, dissemination requirements such as target device type, dissemination timing, intended use of the fully processed traffic data/predictions, and the like.

If the quality threshold is satisfied at block 215, the quality level of the traffic-flow prediction can be marked as shown by block 217, for future reference, reporting, and analysis as needed. For example, information about the traffic-flow prediction, including roadway segment, time, data sources, traffic-probe selection parameters, or the like can be stored in conjunction with a go/no-go indicator, or in conjunction with a specific quality level indicator such as 90/10, or the like.

If the quality threshold is not satisfied at block 215, the traffic-flow prediction can be marked with a quality indicator indicating that the prediction is erroneous, or not otherwise meeting quality requirements, as shown by block 219. In addition to marking the traffic-flow prediction as erroneous, the traffic-flow prediction can be flagged for further review and inclusion in various quality reports, and stored in conjunction with information related to other traffic data processed to arrive at the traffic-flow prediction, for example a roadway segment and time associated with the traffic-flow prediction, data sources, traffic-probe selection parameters, prediction algorithm identifier specifying which prediction algorithm or version of a prediction algorithm was used to produce the traffic-flow prediction, which algorithm was used in the verification/quality determination process, one or more sources of data used in the traffic-flow prediction, identification of selected traffic-probe types, or the like.

In some embodiments, after marking a traffic-flow prediction as erroneous at block 219, a prediction algorithm used to generate the erroneous traffic-flow prediction can be altered automatically or manually, as illustrated by block 221. As an example of automated adjustment of the prediction algorithm, if more than a predetermined portion of traffic-flow predictions are determined to be erroneous for a particular roadway segment, information from particular data probe device types can be excluded from use by the prediction algorithm, time and/or location parameters can be made more or less strict, different weighting factors can be applied to particular dataset sources and/or particular traffic probe devices, or the like.

For example, if at least 20 percent of traffic-flow predictions for a roadway segment are determined to be erroneous during weekday morning drive times, but only 1 percent of traffic-flow predictions for the same roadway segment are determined to be erroneous during weekday afternoon drive times, the algorithm used for weekday morning drive time traffic-flow predictions can be adjusted to assign different weights to a particular type of traffic probe device, or to completely ignore a particular type of traffic probe device. Thus, if a comparison between various different types of traffic probe devices indicates that devices carried by long-haul trucks, which may be required to travel in a particular lane during morning drive times, consistently indicate slower speeds than indicated by traffic probe devices carried in passenger vehicles, the prediction algorithm can be adjusted so that the type of traffic probe device associated with the long-haul trucks is ignored during morning drive times.

Similarly, carpooling passenger vehicles might carry four passengers, each with a mobile phone acting as a traffic probe device. This could result in the travel speed of a single vehicle contributing information from four traffic probe devices, instead of just one. Thus, a weight given to information associated with cars in a carpool lane, which can be determined by various traffic cameras and/or roadway sensors, can be adjusted downward to account for the possibility that multiple traffic probe devices might associated with that car.

Figure 3:
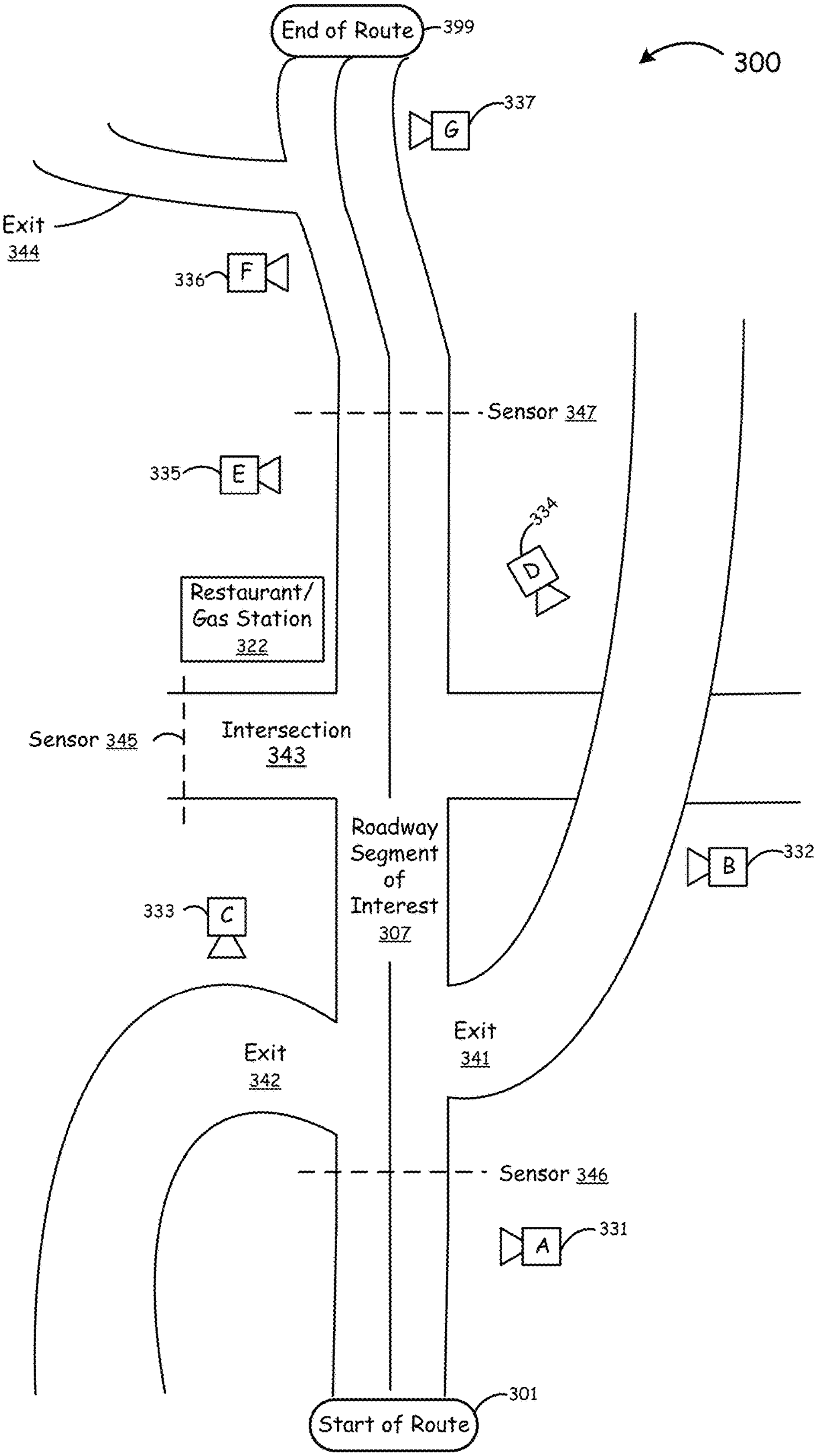
FIG. 3 is a diagram illustrating use of information from one or more traffic probe devices to determine whether a traffic probe device associated with a vehicle is to be used, or excluded from use, in determining traffic data quality measures, in accordance with various embodiments of the present disclosure.

Referring next to FIG. 3, a diagram 300 illustrating use of information from one or more traffic probe devices to determine whether a traffic probe device associated with a vehicle is to be used, or excluded from use, in determining traffic data quality measures, will be discussed in accordance with various embodiments of the present disclosure. Diagram 300 includes a roadway segment of interest 307, which begins at start of route endpoint 301 and ends at end of route endpoint 399. Roadway segment of interest includes exits 341, 342, 344, and intersection 343, any of which can provide a driver the opportunity to either enter or leave roadway segment of interest 307 at some point other than the endpoints. Various substantially fixed-position traffic probe devices are illustrated adjacent to roadway segment of interest 307, including traffic cameras 331, 332, 333, 334, 335, 336, 337, and; traffic sensors 345, 346, 347. Also illustrated in diagram 300 is restaurant/gas station 322. Not specifically illustrated in diagram 300 are traffic probe devices typically carried by vehicles and/or vehicle occupants, such as navigation device 141 (FIG. 1), user handset 143 (FIG. 1), user computing device 145 (FIG. 1), and other user processing device 147 (FIG. 1).

In at least some embodiments, traffic probe devices that travel less than the entire roadway segment of interest 307 are excluded from use in performing traffic data verification. That is not to say that traffic probe devices travelling less than the entire roadway segment cannot be used in generating the traffic-flow prediction being verified.

Consider the following set of three examples, relating to traffic flow along roadway segment of interest 307 on a particular date at a particular time. Assume for all three examples, that a traffic-flow prediction has been made based on information from various traffic probes, including those illustrated in diagram 300 and those not illustrated but carried in vehicles travelling roadway segment of interest 307. The traffic-flow prediction, which was distributed to drivers as discussed previously with respect to FIG. 1, indicates "slow" traffic flow speeds between 10-45 mph. A traffic-flow validation assessing the quality of the traffic-flow prediction distributed to drivers is to be performed, and according to various embodiments information related to certain drivers (and obtained from particular traffic probe devices) is to be excluded from the validation process.

In a first example, a first driver is using a mobile device navigation application on his smart phone, travels the entire roadway segment of interest 307 without stopping or taking a detour. A determination regarding whether the first driver actually travelled the entire roadway segment of interest 307 can be made based on information obtained from the driver's smart phone, which is keeping track of the user's location and providing the user traffic information. For example, the driver may have previously permitted the mobile navigation application to send anonymous data to a traffic information network. The traffic information network can, in some embodiments, collect speed and location information regarding the location of the driver's smart phone, and transmit that information to the traffic information network via, for example, a mobile communication network. The data collected from the driver's smart phone can be analyzed to determine that the driver travelled continuously from start of route endpoint 301 to end of route endpoint 399 without stopping. In some embodiments, the data from the driver's smart phone can be independently verified by matching time or other information from traffic cameras 331, 335, 336, and 337, from traffic sensors 346 and 347, or otherwise. In this example, based on traffic information about the first driver obtained from one or more traffic probe devices, information from the driver's mobile device navigation application can be selected for use in verifying the quality of the traffic-flow prediction being validated.

In a second example, a second driver, using a navigation device built into his vehicle, travels the entire roadway segment of interest 307, but makes a stop along the way. For example, the second driver may have entered the roadway segment of interest 307 at start of route endpoint 301, turned left at intersection 343, driven past traffic sensor 345, and turned into restaurant/gas station 322 to pick up a breakfast sandwich, then reentered roadway segment of interest 307, and driven past end of route endpoint 399. The total delay may have been less than 6 minutes. In some cases, the traffic-related information obtained from the second driver's navigation device might show that the second driver had travelled the entire roadway segment of interest 307, but could also indicate the stop he made along the way. Additional information from traffic sensor 345, along with information from traffic cameras 331, 335, 336, 337 and traffic sensors 346, 347, could be used to corroborate the information obtained from the navigation device. In this example, based on traffic information about the second driver obtained from one or more traffic probe devices, information from the second driver's navigation device can be excluded use in verifying the quality of the traffic-flow prediction being validated.

In some embodiments, only a portion of the traffic information related to the second driver's stop may be excluded from use in validating/verifying the quality of the traffic-flow prediction, but if the portion of traffic information related to the stop cannot be easily or adequately separated from the relevant travel information, the entire set of traffic information obtained from the navigation device can be excluded.

In a third example, a third driver enters the roadway segment of interest 307 at start of route endpoint 301, but leaves the roadway segment of interest 307 at exit 344. In at least some embodiments, even though the third driver travelled almost the entire roadway segment of interest, any travel related information collected from traffic cameras 331, 335, 336, traffic sensors 346, 347, or from one or more traffic probe devices carried by the third driver can be disqualified from use in verifying the traffic-flow prediction under consideration.

Figure 4:
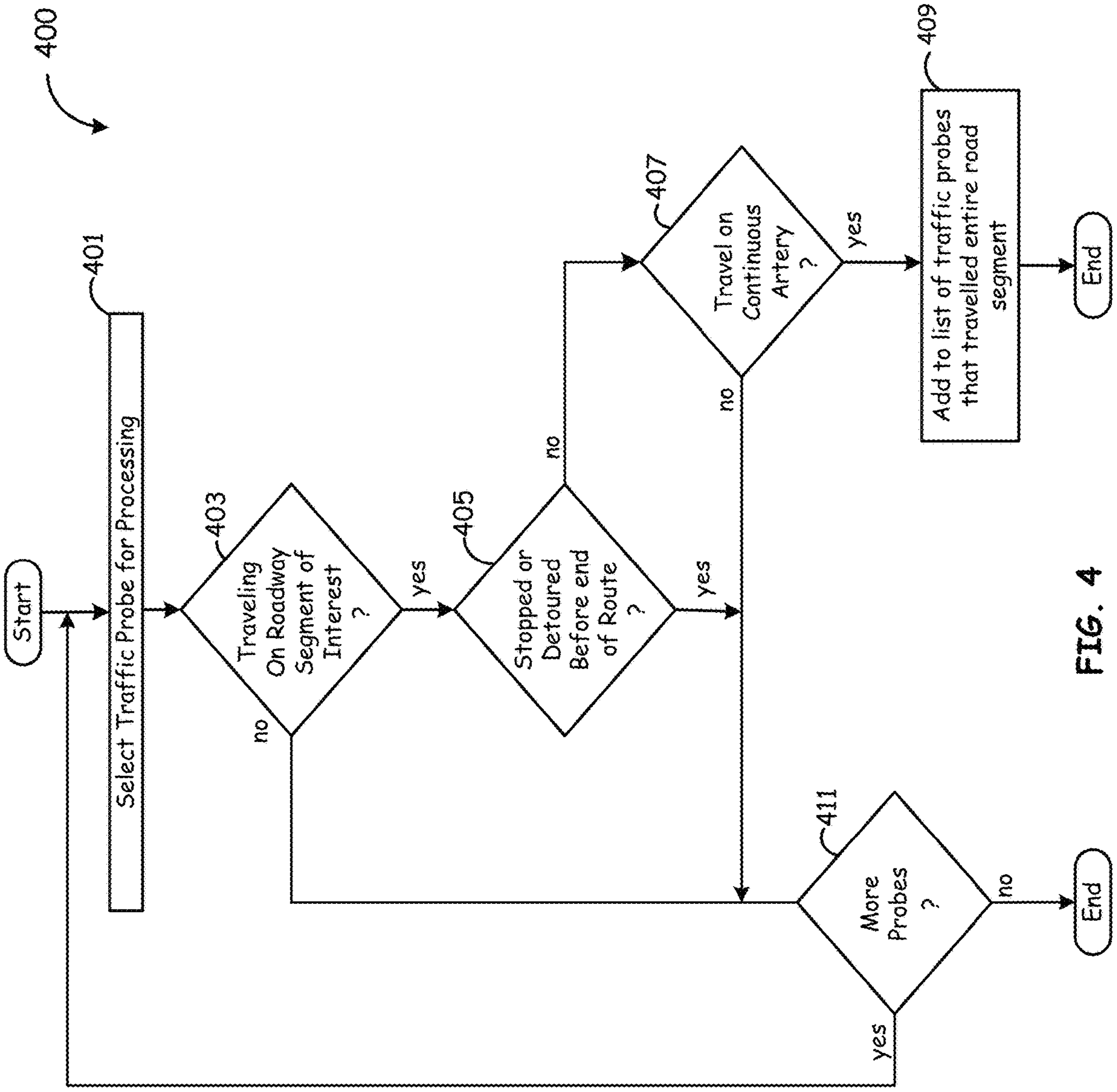
FIG. 4 is a flow diagram illustrating a method of selecting certain traffic probes for use in determining data quality measures, in accordance with various embodiments of the present disclosure.

Referring next to FIG. 4, a flow diagram illustrating a method 400 of selecting traffic probes for use in determining data quality measures, in accordance with various embodiments of the present disclosure. As illustrated by block 401, a traffic probe is selected for processing. Note that selecting a traffic probe for processing refers, in at least one embodiment, to selecting a particular traffic probe device. In some embodiments, selecting a traffic probe can include selecting a group of traffic probes providing information about a particular driver or vehicle. associated with one or more traffic.

In at least one embodiment, an identifiable item of information obtained from one or more traffic probe devices is referred to as a traffic probe. For example, a particular traffic probe device can transmit multiple pieces of information over time, each of these pieces of information can be considered to be a "traffic probe," in various embodiments.

As illustrated at block 403, the traffic probe is checked to determine if the traffic probe device, or a driver associated with the traffic probe or traffic probe device, is traveling on a roadway segment of interest. If not, the traffic probe can be considered irrelevant, and a check is made to determine if there are additional traffic probes to be processed, as illustrated by block 411. If it is determined at block 411 that there are more probes to process, method 400 returns to block 401, where the next probe is selected for processing. If there are no more probes to process, method 400 ends.

If the check at block 403 indicates that the traffic probe device is travelling, or has travelled, along an entire roadway segment of interest, another check is performed at block 405 determine whether the traffic probe device stopped or detoured before the end of the roadway segment of interest, or if the traffic probe entered the route somewhere after the beginning of the roadway segment of interest. If the traffic probe stopped, detoured, or entered after the start of the roadway segment of interest, the traffic probe is ignored, and method 400 proceeds to block 411.

If, however, the traffic probe device did not stop, detour, or enter late, as determined at block 405, another check is made at block 407 to determine whether the traffic probe travelled on a continuous artery. If the results of the check at block 407 are negative, the traffic probe is ignored, and method 400 proceeds to block 411. If, however, the check at block 407 is affirmative, the traffic probe can be added to a list of traffic probes that travelled an entire road segment of interest, as illustrated by block 409.

In at least some embodiments, the list generated by adding traffic probes at block 409 can be used to define the set of traffic probes that will be used in validating traffic data, such as a traffic-flow prediction associated with the road segment of interest.

Referring next to FIG. 5, a flow diagram illustrating a method 500 of determining a ground truth for use in a traffic validation analysis, in accordance with various embodiments of the present disclosure. As illustrated at block 501, traffic datasets including traffic probes can be obtained from any of various dataset sources, such as first dataset source 103 or second dataset source 105, illustrated in FIG. 1.

As illustrated at block 503, a road segment to be validated is determined. Reference to validating a road segment includes validating one or more traffic-flow predictions made regarding that road segment, where each of those predictions can be associated with particular days and/or times. As illustrated by block 505, a list of traffic probes/traffic probe devices that travelled the entire road segment during relevant time periods is generated. An example of how such a list can be generated has been previously discussed with reference to FIG. 4, although other techniques for generating the list can be used in various implementations.

The list of traffic probes generated or otherwise obtained at block 505 can be ordered according to travel times, as illustrated by block 507. For example, the traffic probes can be ordered from shortest travel times across the entire segment of interest to longest travel times across the entire segment of interest. Although not specifically illustrated, in some embodiments, the list of traffic probes can be ranked based on top speed, slowest speed, variability or consistency of speed, or some combination of travel time and speed.

As illustrated by block 509, traffic probes representing outliers can be removed from consideration in the traffic validation analysis. For example, the top and bottom 10 percent of travel times can be removed from consideration. In some embodiments, traffic probes falling outside of a designated portion of a bell curve centered on a calculated average travel time or speed variability can be removed. Other techniques for removing outliers can be employed without departing from the spirit and scope of the present disclosure.

As illustrated by block 511, an estimated travel time of a "normal" driver along the entire road segment of interest can be determined. For example, a median, mean, or average travel time of any traffic probes remaining in the list after removal of the outliers can be determined.

As illustrated at block 513, in at least one embodiment, the estimated travel time of a "normal" driver is used as the estimated actual traffic-flow information, which is used as a ground truth in a traffic validation analysis that determines quality ratios associated with a traffic-flow prediction.

Referring now to FIG. 6, a high-level block diagram of a processing system that can be used to implement various devices used in implementing claimed devices, systems, and methods, is illustrated and discussed, according to various embodiments of the present disclosure. Processing system 600 includes one or more central processing units, such as CPU A 605 and CPU B 607, which may be conventional microprocessors interconnected with various other units via at least one system bus 610. CPU A 605 and CPU B 607 may be separate cores of an individual, multi-core processor, or individual processors connected via a specialized bus 611. In some embodiments, CPU A 605 or CPU B 607 may be a specialized processor, such as a graphics processor, other co-processor, or the like.

Processing system 600 includes random access memory (RAM) 620; read-only memory (ROM) 615, wherein the ROM 615 could also be erasable programmable read-only memory (EPROM) or electrically erasable programmable read-only memory (EEPROM); input/output (I/O) adapter 625, for connecting peripheral devices such as disk units 630, optical drive 636, or tape drive 637 to system bus 610; a user interface adapter 640 for connecting keyboard 645, mouse 650, speaker 655, microphone 660, or other user interface devices to system bus 610; communications adapter 665 for connecting processing system 600 to an information network such as the Internet or any of various local area networks, wide area networks, telephone networks, or the like; and display adapter 670 for connecting system bus 610 to a display device such as monitor 675. Mouse 650 has a series of buttons 680, 685 and may be used to control a cursor shown on monitor 675.

It will be understood that processing system 600 may include other suitable data processing systems without departing from the scope of the present disclosure. For example, processing system 600 may include bulk storage and cache memories, which provide temporary storage of at least some program code in order to reduce the number of times code must be retrieved from bulk storage during execution.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to." As may even further be used herein, the term "configured to," "operable to," "coupled to," or "operably coupled to" indicates that an item includes one or more of power connections, input(s), output(s), etc., to perform, when activated, one or more its corresponding functions and may further include inferred coupling to one or more other items. As may still further be used herein, the term "associated with," includes direct and/or indirect coupling of separate items and/or one item being embedded within another item.

As may be used herein, the term "compares favorably," indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module," "processing circuit," "processor," and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or may further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the figures. Such a memory device or memory element can be included in an article of manufacture.

One or more embodiments of an invention have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The one or more embodiments are used herein to illustrate one or more aspects, one or more features, one or more concepts, and/or one or more examples of the invention. A physical embodiment of an apparatus, an article of manufacture, a machine, and/or of a process may include one or more of the aspects, features, concepts, examples, etc., described with reference to one or more of the embodiments discussed herein. Further, from figure to figure, the embodiments may incorporate the same or similarly named functions, steps, modules, etc., that may use the same or different reference numbers and, as such, the functions, steps, modules, etc., may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module includes a processing module, a processor, a functional block, hardware, and/or memory that stores operational instructions for performing one or more functions as may be described herein. Note that, if the module is implemented via hardware, the hardware may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure of an invention is not limited by the particular examples disclosed herein and expressly incorporates these other combinations.

What is claimed is:

1. A method comprising:

obtaining one or more traffic-data sets including traffic probes, wherein the traffic probes include one or more identifiable items of information obtained from one or more traffic probe devices;

selecting a traffic flow prediction to be validated, wherein the traffic flow prediction is associated with a road segment and a time period;

generating a list of traffic probes to be used in validating the traffic flow prediction, wherein the list of traffic probes includes information obtained from traffic probe devices that travelled an entire length of the road segment during the time period;

ordering travel times of the traffic probe devices that travelled an entire length of the road segment during the time period;

remove outliers from the list of traffic probes;

generating a validated traffic-flow prediction based on traffic probes remaining in the list of traffic probes; and transmitting the validated traffic-flow prediction to an end-user processing device.

2. The method of claim 1, wherein:

removing the outliers includes removing one or more traffic probes obtained from one or more traffic probe devices having travel-times falling outside of a designated portion of a bell curve centered on a calculated average travel time associated with the entire length of the road segment.

3. The method of claim 1, wherein:

removing the outliers includes removing one or more traffic probes obtained from one or more traffic probe devices falling within an upper and lower travel time threshold.

4. The method of claim 1, further comprising:

determining an estimated travel time of a normal driver along the entire length of the road segment based on at least one of median, mean, or average travel time of traffic probe devices associated with traffic probes remaining in the list.

5. The method of claim 4, further comprising:

using the estimated travel time of the normal driver along the entire length of the road segment as a ground truth in a traffic validation analysis to determine quality ratios associated with the traffic flow prediction.

6. The method of claim 1, further comprising:

ranking traffic probes included in the list based on one or more of the following: a top speed associated with a corresponding traffic probe device, a slowest speed associated with the corresponding traffic probe device, a variability or consistency of speed associated with the corresponding traffic probe device, or a combination of a travel time and a speed associated with the corresponding traffic probe device; and wherein removing the outliers includes removing one or more traffic probes based on a relative ranking of the traffic probes.

7. The method of claim 1, wherein generating the list of traffic probes to be used in validating the traffic flow prediction includes:

selecting a group of traffic probes providing information about a particular driver.

8. A processing hub comprising:

at least a first processor and associated memory configured to implement a data set input processing module, the data set input processing module configured to:

obtain one or more traffic-data sets including traffic probes, wherein the traffic probes include one or more identifiable items of information obtained from one or more traffic probe devices; and at least a second processor and associated memory configured to implement a data validation module, the data validation module configured to:

select a traffic flow prediction to be validated, wherein the traffic flow prediction is associated with a road segment and a time period;

generate a list of traffic probes to be used in validating the traffic flow prediction, wherein the list of traffic probes includes information obtained from traffic probe devices that travelled an entire length of the road segment during the time period;

order travel times of the traffic probe devices that travelled an entire length of the road segment during the time period;

remove outliers from the list of traffic probes;

generate a validated traffic-flow prediction based on traffic probes remaining in the list of traffic probes; and at least a second processor and associated memory configured to implement a data output processing module, the data output processing module configured to:

transmit the validated traffic-flow prediction to an end-user processing device.

9. The processing hub of claim 8, wherein the data validation module is further configured to:

remove one or more traffic probes obtained from one or more traffic probe devices having travel-times falling outside of a designated portion of a bell curve centered on a calculated average travel time associated with the entire length of the road segment.

10. The processing hub of claim 8, wherein the data validation module is further configured to:

remove one or more traffic probes obtained from one or more traffic probe devices falling within an upper and lower travel time threshold.

11. The processing hub of claim 8, wherein the data validation module is further configured to:

determine an estimated travel time of a normal driver along the entire length of the road segment based on at least one of median, mean, or average travel time of traffic probe devices associated with traffic probes remaining in the list.

12. The processing hub of claim 11, wherein the data validation module is further configured to:

use the estimated travel time of the normal driver along the entire length of the road segment as a ground truth in a traffic validation analysis to determine quality ratios associated with the traffic flow prediction.

13. The processing hub of claim 8, wherein the data validation module is further configured to:

rank traffic probes included in the list based on one or more of the following: a top speed associated with a corresponding traffic probe device, a slowest speed associated with the corresponding traffic probe device, a variability or consistency of speed associated with the corresponding traffic probe device, or a combination of a travel time and a speed associated with the corresponding traffic probe device; and remove one or more traffic probes based on a relative ranking of the traffic probes.

14. The processing hub of claim 8, wherein:

the data validation module is further configured to generate the list of traffic probes to be used in validating the traffic flow prediction by selecting a group of traffic probes providing information about a particular driver.

15. A system comprising:

one or more processors;

memory coupled to the one or more processors;

a program of computer executable instructions stored in the memory, and configured to be executed by the one or more processors, the program of computer executable instructions including:

at least one instruction to obtain one or more traffic-data sets including traffic probes, wherein the traffic probes include one or more identifiable items of information obtained from one or more traffic probe devices; and at least one instruction to select a traffic flow prediction to be validated, wherein the traffic flow prediction is associated with a road segment and a time period;

at least one instruction to generate a list of traffic probes to be used in validating the traffic flow prediction, wherein the list of traffic probes includes information obtained from traffic probe devices that travelled an entire length of the road segment during the time period;

at least one instruction to order travel times of the traffic probe devices that travelled an entire length of the road segment during the time period;

at least one instruction to remove outliers from the list of traffic probes;

at least one instruction to generate a validated traffic-flow prediction based on traffic probes remaining in the list of traffic probes; and at least one instruction to transmit the validated traffic-flow prediction to an end-user processing device.

16. The system of claim 15, wherein at least one instruction to remove outliers from the list of traffic probes includes:

at least one instruction to remove one or more traffic probes obtained from one or more traffic probe devices having travel-times falling outside of a designated portion of a bell curve centered on a calculated average travel time associated with the entire length of the road segment.

17. The system of claim 15, wherein at least one instruction to remove outliers from the list of traffic probes includes:

at least one instruction to remove one or more traffic probes obtained from one or more traffic probe devices falling within an upper and lower travel time threshold.

18. The system of claim 15, wherein the program of computer executable instructions further includes:

at least one instruction to determine an estimated travel time of a normal driver along the entire length of the road segment based on at least one of median, mean, or average travel time of traffic probe devices associated with traffic probes remaining in the list.

19. The system of claim 18, wherein the at least one instruction to determine an estimated travel time of a normal driver along the entire length of the road segment further includes:

at least one instruction to use the estimated travel time of the normal driver along the entire length of the road segment as a ground truth in a traffic validation analysis to determine quality ratios associated with the traffic flow prediction.

20. The system of claim 15, wherein the program of computer executable instructions further includes:

at least one instruction to rank traffic probes included in the list based on one or more of the following: a top speed associated with a corresponding traffic probe device, a slowest speed associated with the corresponding traffic probe device, a variability or consistency of speed associated with the corresponding traffic probe device, or a combination of a travel time and a speed associated with the corresponding traffic probe device; and wherein the at least one instruction to remove outliers includes removing one or more traffic probes based on a relative ranking of the traffic probes.

* * * * *